United States Patent Office 3,405,128
Patented Oct. 8, 1968

3,405,128
18 - ALKYLATED - 17α - (2 - ALKYNYL)ESTRA-1,3,5(10)-TRIENE-3,17β-DIOLS, ETHERS AND ESTERS THEREOF
Paul D. Klimstra, Northbrook, Ill., assignor to G. D. Searle & Co., Chicago, Ill., a corporation of Delaware
No Drawing. Filed July 11, 1966, Ser. No. 563,980
7 Claims. (Cl. 260—239.55)

ABSTRACT OF THE DISCLOSURE 18-alkylated 17α-(2-alkynyl) estra-1,3,5(10)-triene-3,17β-diols, ethers and esters thereof useful as deciduogenic agents and estrogen inhibitors possessing minimal estrogenic side-effects and preparable by reaction of the corresponding 17-keto starting materials with the appropriate organometallic reagent.

---

The present invention is concerned with novel steroidal derivatives characterized by 18-alkyl substituents and, in particular, with 18-alkylated 17α - (2 - alkynyl)estra-1,3,5(10)-triene-3,17β-diols and ethers and esters thereof. These novel compounds are represented by the following structural formula

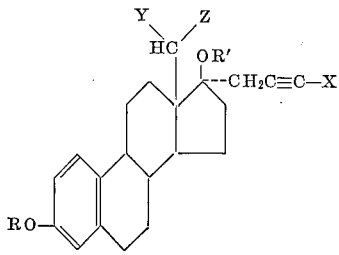

wherein R can be hydrogen or a lower alkyl, lower alkanoyl or tetrahydropyran-2-yl radical, R' is hydrogen or a lower alkanoyl radical, X is hydrogen or a lower alkyl radical, Y is hydrogen or a methyl radical and Z is an alkyl radical such that the total number of carbon atoms encompassed by the Y and Z terms does not exceed 3.

The lower alkyl radicals encompassed by the R and X terms are, typically, methyl, ethyl, propyl, butyl, pentyl, hexyl, heptyl and the branched-chain isomers thereof.

Illustrative of the lower alkanoyl radicals denoted by the R and R' terms are formyl, acetyl, propionyl, butyryl, valeryl, caproyl, heptanoyl and the corresponding branched-chain isomers.

The 13-alkyl substituent represented by the

term can be an ethyl, propyl, isopropyl, butyl, isobutyl, or secondary-butyl radical.

The compounds of this invention are conveniently manufactured by utilizing as starting materials the 17-keto compounds of the following structural formula

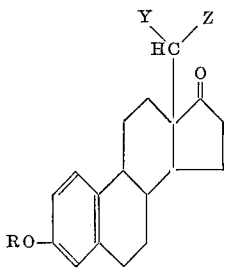

wherein Y and Z are as hereinbefore defined and R is hydrogen or a lower alkyl or lower alkanoyl radical. When those substances are contacted with the appropriate organometallic reagent and the resulting adduct is hydrolyzed, the instant compounds are produced. As a specific example, dl-3-hydroxy-18-methylestra-1,3,5(10)-trien-17-one in benzene is stirred with dihydropyran and a catalytic quantity of p-toluenesulfonic acid to yield the corresponding 3-tetrahydropyran-2-yl ether, which is contacted with 2-butynyl magensium bromide in tetrahydrofuran. The adduct formed is hydrolyzed with aqueous ammonium chloride to produce dl-17α-(2-butynyl)-18-methylestra-1,3,5(10)-triene-3,17β-diol 3-tetrahydropyran-2-yl ether.

An alternate method available for production of the instant 3-hydroxy derivatives involves cleavage of the corresponding 3-tetrahydropyran-2-yl ethers. The aforementioned dl-17α-(2-butynyl)-18-methylestra-1,3,5(10)-triene-3,17β-diol 3-tetrahydropyran-2-yl ether, for example, is allowed to react with p-toluenesulfonic acid in methanol to yield dl-17α(2-butynyl)-18-methylestra-1,3,5(10)-triene-3,17β-diol.

Esterification of the instant 3-hydroxy compounds with a lower alkanoic acid anhydride or halide, preferably in the presence of a suitable acid acceptor, provides an alternate route to the instant 3-(lower alkanoates). dl-17α-(2-butynyl)-18-methylestra-1,3,5(10)-triene-3,17β-diol is thus contacted with acetic anhydride and pyridine to produce the corresponding 3-acetate. The 3,17-bis-(lower alkanoates) are suitably manufactured by heating the corresponding 3,17β-diol with the appropriate isopropenyl ester in the presence of a suitable catalyst. Heating of the aforementioned dl - 17α - (2 - butynyl) - 18 - methylestra-1,3,5(10)-triene-3,17β-diol with isopropenyl acetate in the presence of p-toluenesulfonic acid thus results in the corresponding 3,17-diacetate.

The compounds of this invention display valuable pharmacological properties. They are hormonal and antihormonal agents, for example. In particular, they exhibit deciduogenic activity, i.e. induce decidual cell formation in the uterine endometrium, while exhibiting only minimal estrogenic side-effects. They exhibit, in addition, antiestrogenic activity.

The instant compounds are useful also as intermediates in the manufacture of the corresponding 17α-(2-alkenyl) compounds of the structural formula

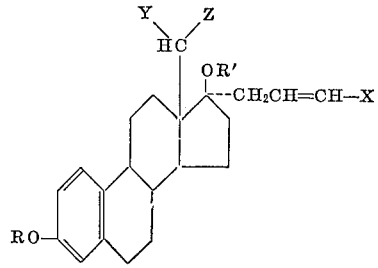

wherein R, R', X, Y and Z are as hereinbefore defined. That transformation is preferably accomplished by partial catalytic hydrogenation. The aforementioned dl-17α-(2-butynyl) - 18-methylestra-1,3,5(10)-triene-3,17β-diol, for example, in pyridine solution, is stirred in a hydrogen atmosphere at atmospheric pressure and room temperature with 5% palladium-on-carbon catalyst to afford 17α-(2-butenyl)-18-methylestra-1,3,5(10)triene-3,17β-diol.

The compounds of this invention, as obtained by the procedures described hereinbefore, exist as dl-mixtures. The optically active d and l forms can be separated from those mixtures by various standard resolution techniques. Typically, the instant diols are converted to an acid ester by reaction with a dibasic acid anhydride, e.g. succinic or phthalic anhydride, and those acid esters are resolved by conversion to the amine salts utilizing optically active amines such as brucine, morphine, quinine, quinidine, strychnine, etc.

The invention will appear more fully from the examples which follow. These examples are given by way of illustration only and are not to be construed as limiting the invention either in spirit or in scope as many modifications both in materials and methods will be apparent from this disclosure to those skilled in the art. In the following examples, temperatures are given in degrees centigrade (° C.) and quantities of materials in parts by weight unless otherwise noted.

EXAMPLE 1

To a solution of 10.2 parts of dl-3-hydroxy-18-methylestra-1,3,5(10)-trien-17-one and 6.5 parts of dihydropyran in 176 parts of dry benzene is added 0.02 part of p-toluenesulfonic acid monohydrate, and the resulting reaction mixture is stirred at room temperature for about 2½ hours. Evaporation of the mixture to dryness under reduced pressure affords a residue, which is purified by recrystallization from acetone-hexane to yield pure dl-3-hydroxy-18-methylestra-1,3,5(10)-trien-17-one 3-tetrahydropyran-2-yl ether, which melts at about 129–132°. This compound is characterized further by an optical rotation, in chloroform of —4° and by the following structural formula

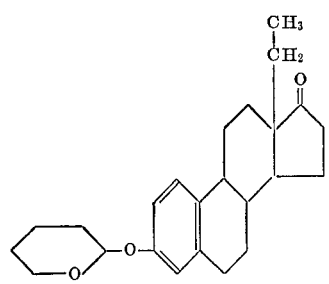

EXAMPLE 2

A mixture of 3.3 parts of magnesium turnings and 0.168 part of mercuric chloride with 35 parts of ether is cooled to 0–5°, and a solution of 14.8 parts of 1-bromo-2-butyne in 77 parts of ether is added over a period of about 90 minutes. The resulting reaction mixture is stirred for approximately 2 hours at about 7–10°, following which time a solution of 10 parts of dl-3-hydroxy-18-methylestra-1,3,5(10)-trien-17-one 3-tetrahydropyran-2-yl ether is added over a period of about one hour. Stirring is continued at 7–10° for about 3 hours longer, then at room temperature for about 16 hours. The reaction mixture is heated at the reflux temperature for about 2½ hours, cooled and diluted with 30 parts by volume of saturated aqueous ammonium chloride. The organic layer is separated by decantation. To the residual aqueous layer there is added successively solid sodium sulfate and fresh tetrahydrofuran, and the organic layer is again separated by decantation. The combined organic layers are stripped of solvent under reduced pressure to afford an oily residue. That material is dissolved in benzene and chromatographed on a silica gel column. Elution of the column with 5% ethyl acetate in benzene followed by recrystallization of the eluted fraction from aqueous methanol affords dl-17α-(2-butynyl)-18-methylestra - 1,3,5(10)-triene-3,17β-diol 3-tetrahydropyran-2-yl ether, melting at about 73–76°. The compound is represented by the following structural formula

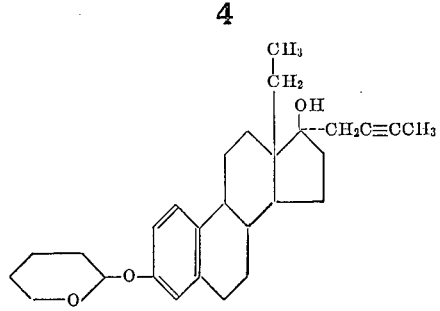

EXAMPLE 3

By substituting an equivalent quantity of 1-bromo-2-pentyne and otherwise proceeding according to the processes described in Example 2, there is produced dl-18-methyl - 17α - (2 - pentynyl)estra-1,3,5(10)-triene-3,17β-diol 3-tetrahydropyran-2-yl ether.

EXAMPLE 4

To a refluxing mixture containing 27 parts of dl-3-hydroxy-18-methylestra-1,3,5(10)-trien-17-one, 33 parts of zinc metal and 450 parts of tetrahydrofuran is added dropwise with stirring 60 parts of 1-bromo-2-propyne. The reaction mixture is then stirred at the reflux temperature for an additional 90 minutes, following which time it is cooled and the supernatant is decanted into a mixture of 2000 parts of water containing 120 parts of concentrated hydrochloric acid. That aqueous acidic mixture is extracted with chloroform, and the organic layer is separated, washed with water, dried over anhydrous sodium sulfate and stripped of solvent by distillation under reduced pressure. The resulting brown gummy residue is dissolved in a mixture of 160 parts of ethanol containing 52.5 parts of acetic acid, and 7.5 parts of Girard's-T reagent is added to that solution. That mixture is heated at the reflux temperature for about 30 minutes, then is cooled and poured into ice water. Extraction with a mixture of chloroform and isopropyl alcohol affords an organic solution, which is dried over anhydrous sodium sulfate and concentrated to dryness under reduced pressure. Purification of the resulting residue by recrystallization from acetone-heptane affords dl-17-methyl-17α - (2-propynyl)ester - 1,3,5(10)-triene-3,17β-diol 3-tetrahydropyran-2-yl ether.

EXAMPLE 5

To a solution of 8 parts of dl-17α-(2-butynyl)-18-methylester-1,3,5(10) - triene-3,17β-diol 3-tetrahydropyran-2-yl ether in 200 parts of methanol is added 0.7 part p-toluenesulfonic acid monohydrate, and the resulting reaction mixture is kept at room temperature for about 30 minutes, then is diluted with water to turbidity. The diluted mixture is cooled, and the precipitated product is collected by filtration, then dried and purified by recrystallization from methanol to afford dl-17α(2-butynyl)-18-methylestra-1,3,5(10)-triene-3,17β-diol, melting at about 188–189°. It exhibits an optical rotation, in chloroform, of —3° and is represented by the following structural formula

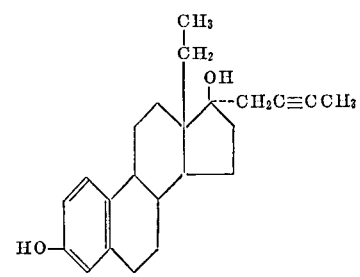

EXAMPLE 6

The substitution of an equivalent quantity of dl-18-methyl-17α - (2-propynyl)estra - 1,3,5(10)-triene-3,17β-diol 3-tetrahydropyran-2-yl ether in the procedure of Example 5 results in dl-18-methyl-17α-(2-propynyl)estra-1,3,5(10)-triene-3,17β-diol.

EXAMPLE 7

When an equivalent quantity of dl-3-ethoxy-18-methpentynyl)estra - 1,3,5(10)-triene-3,17β-diol 3-tetrahydropyran-2-yl ether is substituted in the procedure of Example 5, there is obtained dl-18-methyl-17α-(2-pentynyl)estra-1,3,5(10)-triene-3,17β-diol.

EXAMPLE 8

The substitution of an equivalent quantity of dl-3-methoxy-18-methylestra-1,3,5(10)-trien-17-one in the procedure of Example 2 results in dl-17α-(2-butynyl)-18-methylestra-1,3,5(10)-triene-3,17β-diol 3-methyl ether.

EXAMPLE 9

When an equivalent quantity of dl-3-ethoxy-18-methylester-1,3,5(10)-trien-17-one is substituted in the procedure of Example 2, there is produced dl-17α-(2-butynyl)-18-methylestra-1,3,5(10)-triene-3,17β-diol 3-ethyl ether.

EXAMPLE 10

A mixture containing 4 parts of dl-17α-(2-butynyl)-18-methylestra-1,3,5(10)-triene-3,17β-diol, 40 parts of pyridine and 20 parts of acetic anhydride is stored at room temperature for about 16 hours, then is diluted with water and extracted with ether. The organic solution is washed successively with water, dilute hydrochloric acid and dilute aqueous sodium bicarbonate, then dried over anhydrous sodium sulfate containing decolorizing carbon. Removal of the solvent by distillation under reduced pressure affords an oily residue, which is purified by chromatography of a benzene solution on silica gel followed by elution with 5% ethyl acetate and recrystallization of the eluted fraction from methanol, thus affording dl-17α-(2-butynyl) - 18-methylestra-1,3,5(10)-triene-3,17β-diol 3-acetate, melting at about 124–128°. It exhibits an optical rotation, in chloroform, of +1° and is characterized by the following structural formula

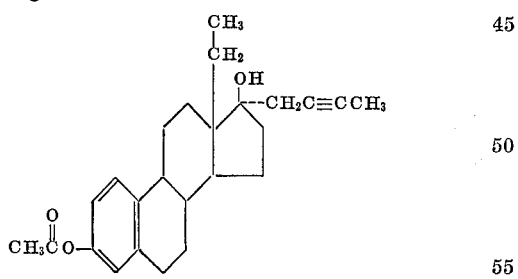

EXAMPLE 11

By substituting an equivalent quantity of propionic anhydride and otherwise proceeding according to the processes described in Example 10, there is produced dl-17α-(2-butynyl) - 18-methylestra - 1,3,5(10)-triene-3,17β-diol 3-propionate.

EXAMPLE 12

A mixture containing one part of dl-17a-(2-butynyl)-18-methylestra-1,3,5(10)-triene-3,17β-diol, 18.4 parts of isopropenyl acetate and 0.15 part of p-toluenesulfonic acid is distilled slowly over a period of about 9 hours, then is cooled and diluted with ether. The organic solution is washed successively with water, dilute aqueous sodium carbonate and water, then dried over anhydrous sodium sulfate containing activated carbon and stripped of solvent at reduced pressure. The resulting oily residue is recrystallized from methanol to afford dl-17a-(2-butynyl)-18-methylestra-1,3,5(10)-triene-3,17β-diol 3,17-diacetate.

EXAMPLE 13

When an equivalent quantity of isopropenyl propionate is substituted in the procedure of Example 12, there is produced dl-17a - (2 - butynyl)-18-methylestra-1,3,5(10)-triene-3,17β-diol 3,17-dipropionate.

What is claimed is:
1. A compound of the formula

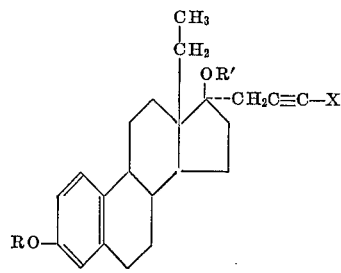

wherein R is a member of the class consisting of hydrogen, tetrahydropyran-2-yl, lower alkyl and lower alkanoyl radicals, R' is selected from the group consisting of hydrogen and lower alkanoyl radicals and X is selected from the group consisting of hydrogen and lower alkyl radicals.

2. As in claim 1, a compound of the formula

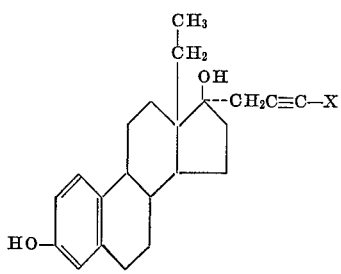

wherein X is selected from the group consisting of hydrogen and a lower alkyl radical.

3. As in claim 1, a compound of the formula

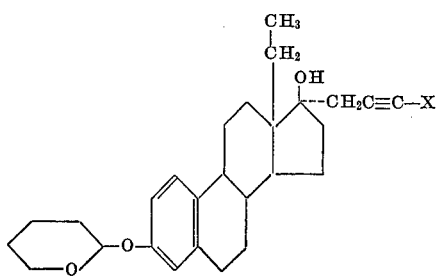

wherein X is selected from the group consisting of hydrogen and a lower alkyl radical.

4. As in claim 1, a compound of the formula

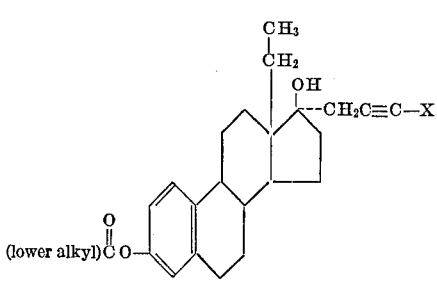

wherein X is selected from the group consisting of hydrogen and a lower alkyl radical.

5. As in claim 1, the compound which is 17a-(2- butynyl)-18-methylestra-1,3,5(10)-triene-3,17β-diol 3-tetrahydropyran-2-yl ether.

6. As in claim 1, the compound which is 17α-(2-butynyl)18-methylestra-1,3,5(10)-triene-3,17β-diol.

7. As in claim 1, the compound which is 17α-(2-butynyl)-18-methylestra-1,3,5(10)-triene-3,17β-diol 3-acetate.

References Cited

UNITED STATES PATENTS 3,299,105    1/1967   Anner et al. _____ 260—397.4
3,290,297   12/1966   Cross _____ 260—239.55

ELBERT L. ROBERTS, *Primary Examiner.*